United States Patent
Sung

(10) Patent No.: US 8,038,071 B2
(45) Date of Patent: Oct. 18, 2011

(54) SMART CARD SYSTEM AND DRIVING METHOD THEREOF

(75) Inventor: Hyuk-Jun Sung, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 281 days.

(21) Appl. No.: 12/397,579

(22) Filed: Mar. 4, 2009

(65) Prior Publication Data
US 2009/0224046 A1    Sep. 10, 2009

(30) Foreign Application Priority Data
Mar. 7, 2008    (KR) .............................. 2008-0021664

(51) Int. Cl.
*G06K 19/06* (2006.01)

(52) U.S. Cl. .................. 235/492; 235/380; 235/451

(58) Field of Classification Search .................. 235/492, 235/380, 451, 487
See application file for complete search history.

(56) References Cited

U.S. PATENT DOCUMENTS

| | | | |
|---|---|---|---|
| 5,047,924 A * | 9/1991 | Fujioka et al. ................ | 713/501 |
| 6,035,380 A * | 3/2000 | Shelton et al. ................ | 711/163 |
| 7,493,510 B2 * | 2/2009 | Sung et al. .................... | 713/503 |
| 2002/0097144 A1 * | 7/2002 | Collins et al. ................. | 340/333 |
| 2003/0206444 A1 * | 11/2003 | Matsuda et al. ......... | 365/185.18 |
| 2004/0076251 A1 * | 4/2004 | Kim .............................. | 375/354 |
| 2005/0216780 A1 | 9/2005 | Sung et al. | |

FOREIGN PATENT DOCUMENTS

| | | |
|---|---|---|
| EP | 0525963 A2 | 2/1993 |
| KR | 1020050040289 A | 5/2005 |
| KR | 1020050098142 A | 10/2005 |
| KR | 1020070061441 A | 6/2007 |

* cited by examiner

*Primary Examiner* — Edwyn Labaze
(74) *Attorney, Agent, or Firm* — F. Chau & Associates, LLC

(57) ABSTRACT

A smart card system may include a smart card; and a smart card reader configured to communicate via a smart card protocol with the smart card, wherein the smart card includes a modulus counter that generates an operation clock of the smart card by receiving an external clock complying with the smart card protocol from the smart card reader, dividing the external clock a first and a second time to generate a first and a second dividing clock, counting the first dividing clock for A number of times, and counting the second dividing clock for N-A number of times.

11 Claims, 2 Drawing Sheets

SMART CARD SYSTEM AND DRIVING METHOD THEREOF

PRIORITY STATEMENT

This application claims priority under 35 U.S.C §119 to Korean Patent Application No. 2008-0021664, filed on Mar. 7, 2008, in the Korean Intellectual Property Office, the entire contents of which are incorporated by reference.

BACKGROUND

1. Technical Field

The present disclosure relates to a smart card, more particularly, to a smart card system configured to control the speed of an internal clock of the smart card to decrease power consumption and a corresponding method thereof.

2. Discussion of Related Art

A contactless smart card communicates with a smart card reader in accordance with the ISO 14443 protocol. The contactless smart card is designed to recover a command that the smart card reader transmits and to respond at the correct time.

In order to enable communications between the smart card and the smart card reader, which are separated by a great distance, the units must operate with a low power. As data output from the smart card reader is transferred in a wireless format, it is required that the circuits operate accurately. In other words, in order to respond within a predetermined period of time after a command from the smart card reader is received, the smart card may respond after counting with a clock having a high frequency, for example, 13.56 MHz. The high clock frequency (13.56 MHz), however, may be one of the causes of the high power consumption of the smart card.

As an example, a smart card that complies with the contactless Type A protocol transmits a request signal after a predetermined period of time upon receiving data from the smart card reader. In other words, in the case of data ending in '1', the smart card transmits a response signal after a period of time (9*128+84)/fc (fc=13.56 MHz), and in the case of data ending in '0', the smart card transmits a response signal after a period of time (9*128+20)/fc. In other words, the smart card counts using a counter operating at 13.56 MHz in order to transfer data after predetermined periods of time, either 1236/fc or 1172/fc. In this case, peak currents occur in the smart card at intervals of 13.56 MHz.

SUMMARY

Exemplary embodiments of the present invention are related to a smart card system and driving method thereof. In an exemplary embodiment, a smart card system may include: a smart card; and a smart card reader configured to communicate via the smart card protocol with the smart card, wherein the smart card includes a modulus counter that receives an input of an external clock complying with the smart card protocol from the smart card reader, divides the external clock by a first time and by a second time to generate first and second dividing clocks, counts the first dividing clock for A number of times, and counts the second dividing clock for N−A number of times to generate an operation clock of the smart card.

In an exemplary embodiment of the present invention, a method of driving a smart card system may include: receiving an external clock complying with the smart card protocol from the smart card reader; generating a first dividing clock, which is a value of the external clock divided by a number P; counting the first dividing clock for A number of times to generate a control signal; generating a second dividing clock, which is a value of the external clock divided by a (P+1) number of times, in response to the control signal; and counting the second dividing clock by N−A number of times to generate the operation clock of the smart card. The method of driving a smart card system also including: a smart card; and a smart card reader communicating via a smart card protocol with the smart card.

BRIEF DESCRIPTION OF THE DRAWINGS

The accompanying drawings are included to provide a further understanding of the invention, and are incorporated in and constitute a part of this specification. Exemplary embodiments of the present invention will be understood in more detail from the following descriptions taken in conjunction with the accompanying drawings. In the drawings.

DETAILED DESCRIPTION OF EXEMPLARY EMBODIMENTS

Figure 1:
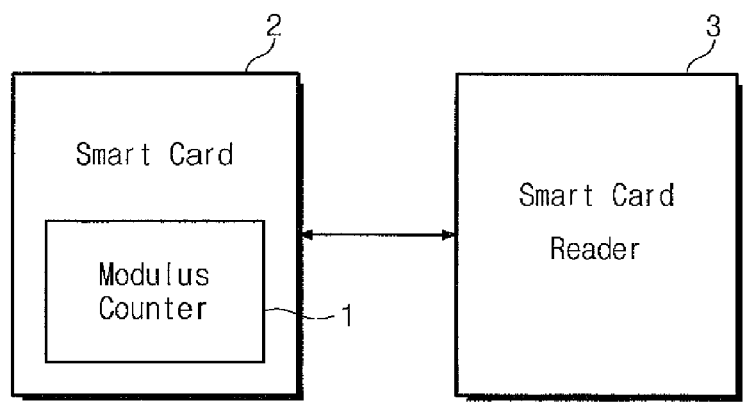
FIG. 1 is a block diagram showing a smart card system according to an exemplary embodiment of the present invention.

The present invention will now be described more fully hereinafter with reference to the accompanying drawings, in which exemplary embodiments of the invention are shown. This invention, however, may be embodied in many different forms and should not be construed as limited to the exemplary embodiments set forth herein. Rather, these exemplary embodiments are provided so that this disclosure will be thorough and complete, and will fully convey the scope of the invention to those of ordinary skill in the art. In the drawings, the thicknesses of layers and regions may be exaggerated for clarity. Like numbers refer to like elements throughout the accompanying figures.

FIG. 1 is a block diagram illustrating a smart card system in accordance to an exemplary embodiment of the present invention.

Referring to FIG. 1, a smart card system 10 includes a smart card 2 and a smart card reader 3, the smart card having a modulus counter 1.

In an exemplary embodiment of the present invention ISO 14443 type A and type B protocols using a non-contact communication method are given as examples for the smart card protocol. The smart card 2 of the present invention includes the modulus counter 1 configured to lower a clock frequency input from an external source (not shown). The smart card 2 communicates with the smart card reader 3 in accordance with the ISO 14443 protocol. The smart card reader 3 transfers an external clock of 13.56 MHz complying with the ISO 14443 protocol to the smart card 2. The smart card 2 inputs the external clock to the modulus counter 1 to generate a an operation clock that is slower than the external clock. The smart card 2 processes data in accordance with the thusly generated operation clock. A method of converting the external clock into the slower operation clock is described in detail with reference to FIG. 2 and FIG. 3.

Figure 2:
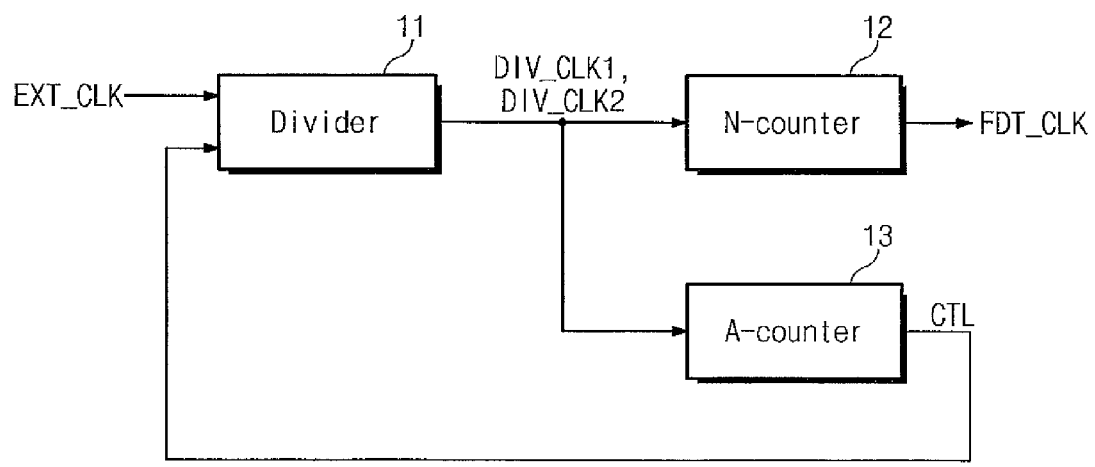
FIG. 2 is a block diagram showing a modulus counter illustrated in FIG. 1.
Figure 3:
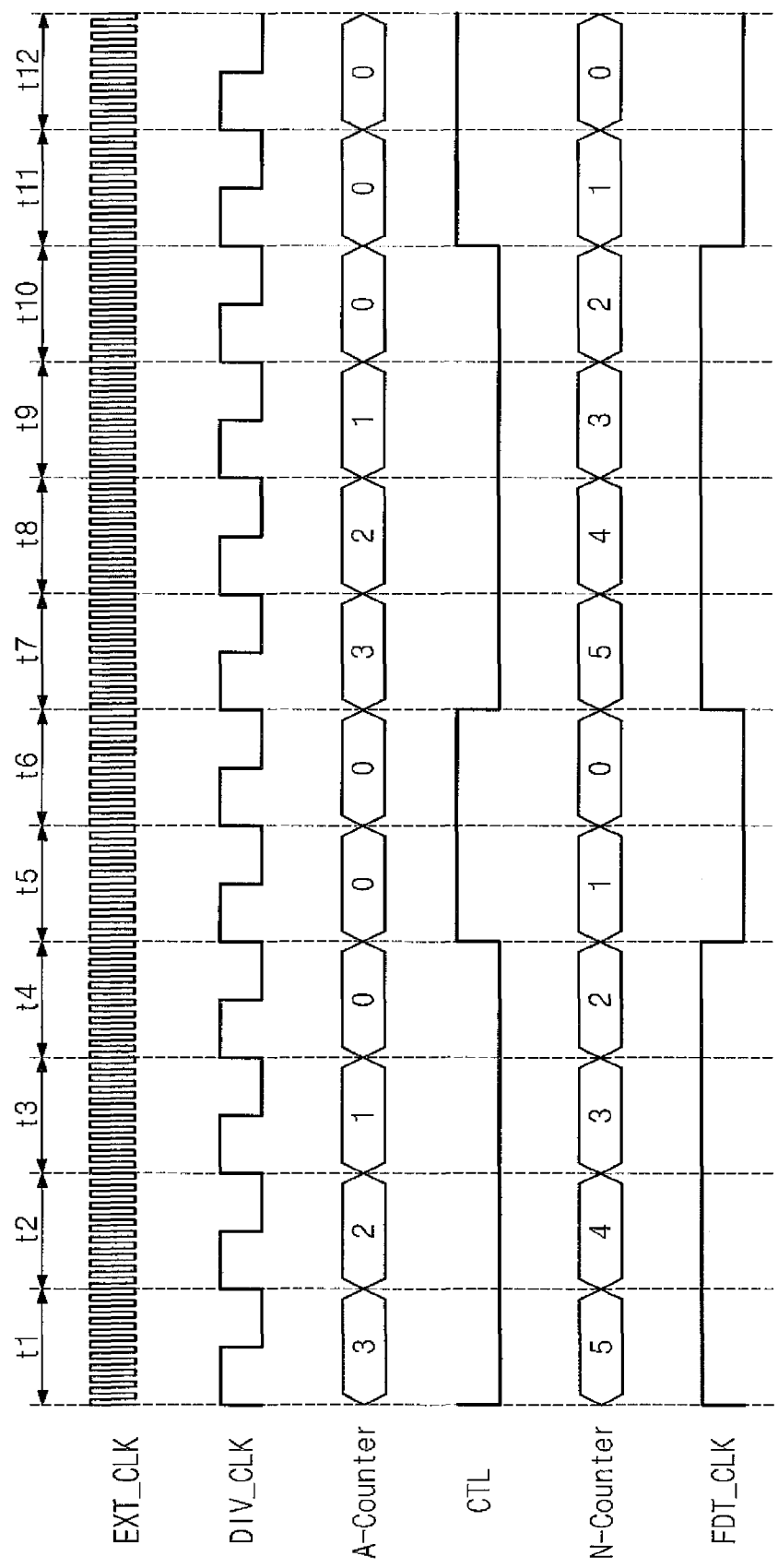
FIG. 3 is a timing diagram for describing an operation of the modulus counter illustrated in FIG. 2.

FIG. 2 is a block diagram illustrating the modulus counter 1 of FIG. 1, and 5 FIG. 3 is a timing diagram illustrating operation of the modulus counter 1 of FIG. 2.

Referring to FIG. 1 and FIG. 2, the modulus counter 1 according to an exemplary embodiment of the present invention includes a divider 11, an N-counter 12 and an A-counter 13 The divider 11 receives the external clock EXT_CLK complying with the ISO 14443 protocol from the smart card reader 3, and generates a first dividing clock DIV_CLK1 and a second dividing clock DIV_CLK2 in response to a control signal CTL.

The first and second dividing clocks DIV_CLK1 and DIV_CLK2, respectively, may have different frequencies from each other according to the control signal CTL. The first and second dividing clocks DIV_CLK1 and DIV_CLK2, respectively, may operate Equation 1, which will be disclosed below. In other words, the first dividing clock DIV_CLK1 maintains a high state while the external clock EXT_CLK is divided by (P+1) and a counting operation is performed A times. The first dividing clock DIV_CLK1 maintains a low state while the external clock EXT_CLK is divided by P and a counting operation is performed (N−A) times. The value P is a divisor, and the value N is a total counting number. The P, N and A are all natural numbers. The value A is larger than or equal to 0, and is smaller than or equal to (P−1).

$$\text{Division ratio}=(P+1)A+P(N-A)$$

$$\text{Division ratio}=PA+A+PN-PA$$

$$\text{Division ratio}=PN+A\,(0\leq A\leq(P-1))\qquad\text{[Equation 1]}$$

The division ratio implies a ratio of a high state to a low state of the operation clock FDT_CLK. In other words, an exemplary embodiment of the present invention proposes a modulus counter to count evenly at a slow clock, for example, a clock obtained by dividing 13.56 MHz by 9 or 10, in comparison to a counter operating at 13.56 MHz of an external clock complying with the ISO 14443 protocol.

For example, while the control signal CTL is in a low state, the divider 11 divides the external clock EXT_CLK by a divisor of 10. In other words, the first dividing clock DIV_CLK1 is 10 times slower than the frequency of the external clock EXT_CLK. When the control signal CTL becomes a high state, the divider 11 divides the external clock EXT_CLK by a divisor of 9. In other words, the second dividing clock DIV_CLK2 is slower by 9 times than the frequency of the external clock EXT_CLK. The divider 11 generates the first and second dividing clocks DIV_CLK1 and DIV_CLK2, respectively, in response to the control signal CTL. The A-counter 13 counts the first dividing clock DIV_CLK1 generated from the divider 11 by A number of times to generate the control signal CTL. The A-counter 13 sends the control signal CTL to the divider 11. The N-counter 12 counts the second dividing clock DIV_CLK2 generated from the divider 11 by (N−A) number of times to generate an operation clock FDT_CLK.

In the Equation 1, P is assumed to be number 9, N to be 6, and A to be 4. A timing diagram of the modulus counter 1 according to this assumption is illustrated in FIG. 3.

Referring to FIG. 1 to FIG. 3, one cycle of the operation clock FDT_CLK is from t1 to t6, or from t7 to t12. That is to say, the operation of the smart card 2 from t7 to t12 is the same as the operation of the smart card 2 from t1 to t6. Therefore, a redundant description is omitted for brevity. The external clock EXT_CLK is toggled 10 times from t1 to t2. The first dividing clock DIV_CLK1, shown in FIG. 3, is toggled once while the external clock EXT_CLK is toggled 10 times. The A-counter 13 maintains the control signal CTL in a low state from t1 to t4. The A-counter 13 counts the first dividing clock DIV_CLK1 generated by the divider 11 for 4 times from t1 to t4. The A-counter 13 activates the control signal CTL to a high state at a time point when time period t5 is initiated. The N-counter 12 counts the first dividing clock DIV_CLK1 generated by the divider 11 for 4 times to maintain the operation clock FDT_CLK in a high state, during the time the control signal CTL is in a low state (t1 to t4). The external clock EXT_CLK is toggled 9 times in each of the time periods t5 and t6. The second dividing clock DIV_CLK2, shown in FIG. 3, is toggled once while the external clock EXT_CLK is toggled 9 times. The A-counter 13 maintains the control signal CTL in a high state from t5 to t6. The A-counter 13 counts the second dividing clock DIV_CLK2 generated from the divider 11 for 2 times, from t5 to t6. The N-counter 12 counts the first dividing clock DIV_CLK1 generated from the divider 11 for 4 times to maintain the operation clock FDT_CLK in the high state, while the control signal CTL is in a low state (t5 to t6). Accordingly, the operation clock FDT_CLK maintains a high state from t1 to t4, and a low state from t5 to t6.

An exemplary embodiment of the present invention includes a modulus counter configured to count 1236/fc or 1172/fc (fc=13.56 MHz) using a slower clock than a clock using 13.56 MHz. Accordingly, exemplary embodiments of the present invention may decrease power consumption of the smart card, thereby to increase a valid communication distance between the smart card and the smart card reader.

Although the present invention has been described in connection with the exemplary embodiment of the present invention illustrated in the accompanying drawings, it is not limited thereto. Persons with ordinary skill in the art will recognize that exemplary embodiments of the present invention may be applied to other types of memory devices The above-disclosed subject matter is to be considered illustrative, and not restrictive, and the appended claims are intended to cover all such modifications, enhancements, and other exemplary embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A smart card system comprising:
   a smart card; and
   a smart card reader configured to communicate with the smart card via a smart card protocol,
   wherein the smart card includes a modulus counter that generates an operation clock of the smart card by receiving an external clock complying with the smart card protocol from the smart card reader, dividing the external clock to generate a first dividing clock and a second dividing clock, counting the first dividing clock for A number of times, and counting the second dividing clock for N−A number of times, and
   wherein the first dividing clock and the second dividing clock have different frequencies from each other.

2. The smart card system of claim 1, wherein the modulus counter comprises:
   a divider configured to generate the first dividing clock and the second dividing clock in response to a control signal;
   an A-counter configured to count the first dividing clock generated by the divider for A number of times to generate the control signal fed to the divider; and
   an N-counter configured to count the second dividing clock generated by the divider for N−A number of times to generate the operation clock.

3. The smart card system of claim 1, wherein the operation clock is maintained in a high state while the first dividing clock is counted for A number of times, and is maintained in a low state while the second dividing clock is counted for N-A number of times.

4. The smart card system of claim 1, wherein the first dividing clock is generated by dividing the external clock by a divisor of P, and the second dividing clock is generated by dividing the external clock by a divisor of (P+1).

5. The smart card system of claim 4, wherein each of A, P and N comprises a natural number.

6. The smart card system of claim 5, wherein A is larger than or equal to 0, and is smaller than or equal to (P−1).

7. The smart card system of claim 1, wherein the operation clock is slower than the external clock.

8. The smart card system of claim 1, wherein the smart card protocol comprises ISO 14443 Type A and Type B protocols.

9. The smart card system of claim 8, wherein the external clock has a frequency 13.56 MHz complying with the ISO 14443 protocol.

10. A method of driving a smart card system that comprises a smart card and a smart card reader communicating via a smart card protocol with the smart card, the method comprising:

receiving an external clock complying with the smart card protocol from the smart card reader;

dividing the external clock by a divisor of P to generate a first dividing clock in response to a control signal;

counting the first dividing clock for A number of times to generate the control signal;

generating a second dividing clock by dividing the external clock divided by a divisor of (P+1) in response to the control signal; and counting the second dividing clock by N-A number of times to generate an operation clock of the smart card, wherein the first dividing clock and the second dividing clock have different frequencies from each other.

11. The method of claim 10, wherein the operation clock is maintained in a high state while the first dividing clock is counted for A number of times, and is maintained in a low state while the second dividing clock is counted for N-A number of times.

* * * * *